(12) United States Patent
Degen et al.

(10) Patent No.: US 9,188,036 B2
(45) Date of Patent: Nov. 17, 2015

(54) EXHAUST SYSTEM WITH HC ADSORBER AND PARALLEL EXHAUST-GAS CATALYTIC CONVERTER, AND VEHICLE HAVING AN EXHAUST SYSTEM OF SAID TYPE

(75) Inventors: Alf Degen, Meinersen (DE); Valeri Seiler, Wahrenholz (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 13/997,617

(22) PCT Filed: Nov. 7, 2011

(86) PCT No.: PCT/EP2011/005583
§ 371 (c)(1),
(2), (4) Date: Jun. 24, 2013

(87) PCT Pub. No.: WO2012/084091
PCT Pub. Date: Jun. 28, 2012

(65) Prior Publication Data
US 2013/0269326 A1   Oct. 17, 2013

(30) Foreign Application Priority Data
Dec. 24, 2010   (DE) .......................... 10 2010 056 281

(51) Int. Cl.
*F01N 3/00* (2006.01)
*F01N 3/02* (2006.01)
(Continued)

(52) U.S. Cl.
CPC .............. *F01N 3/035* (2013.01); *F01N 3/0835* (2013.01); *F01N 3/0878* (2013.01); *F01N 3/101* (2013.01);
(Continued)

(58) Field of Classification Search
CPC ...... Y02T 10/144; F02B 37/007; F02B 37/18; F02B 37/013; F02B 37/004; F01N 13/0097; F01N 13/017; F01N 3/035; F01N 3/0835; F01N 3/0878; F01N 3/101; F01N 3/2053
USPC ................. 60/280, 286, 295, 299, 602, 605.2
See application file for complete search history.

(56) References Cited

U.S. PATENT DOCUMENTS 5,582,003 A   12/1996   Patil et al.
5,738,832 A   4/1998   Dogahara et al.
(Continued)

FOREIGN PATENT DOCUMENTS

DE   37 33 402   4/1989
DE   197 09 432   10/1997
(Continued)

OTHER PUBLICATIONS

International Search Report for International Application No. PCT/EP2011/005583, mailed Feb. 24, 2012.
(Continued)

*Primary Examiner* — Audrey K Bradley
*Assistant Examiner* — Dapinder Singh
(74) *Attorney, Agent, or Firm* — Pearl Cohen Zedek Latzer Baratz LLP

(57) ABSTRACT

The invention relates to an exhaust system (10) for an internal combustion engine, having an exhaust gas path which, at least in sections, has two parallel exhaust ducts (30, 32), specifically a main duct (30) and a secondary duct (32), wherein a HC adsorber (42) for the reversible adsorption of unburned hydrocarbons (HC) is provided in the secondary duct (32); having a setting means (46) for selectively conducting an exhaust gas flow into the main duct (30) and/or into the secondary duct (32), and having a main catalytic converter (40) arranged downstream of the parallel exhaust ducts (30, 32). It is intended that a catalytic exhaust gas converter (44) for converting at least one exhaust gas component is provided in the main duct (30) of the parallel exhaust ducts (30, 32).

16 Claims, 2 Drawing Sheets

(51) Int. Cl.
*F01N 3/10* (2006.01)
*F01N 3/20* (2006.01)
*F01N 3/035* (2006.01)
*F01N 3/08* (2006.01)
*F01N 13/00* (2010.01)
*F01N 3/28* (2006.01)

(52) U.S. Cl.
CPC .......... *F01N 3/2053* (2013.01); *F01N 13/0097* (2014.06); *F01N 13/017* (2014.06); *F01N 3/281* (2013.01); *F01N 2330/48* (2013.01); *Y02T 10/22* (2013.01)

(56) References Cited

U.S. PATENT DOCUMENTS

| | | | |
|---|---|---|---|
| 5,937,637 | A | 8/1999 | Fujishita et al. |
| 5,966,929 | A | 10/1999 | Socha, Jr. |
| 6,334,304 | B1 | 1/2002 | Machida et al. |
| 6,763,655 | B2 | 7/2004 | Ueno et al. |
| 2002/0132726 | A1 | 9/2002 | Endo et al. |
| 2005/0220679 | A1 | 10/2005 | Choi |
| 2006/0123772 | A1 | 6/2006 | Iwamoto et al. |
| 2008/0098733 | A1* | 5/2008 | Dickerson ................ 60/602 |
| 2008/0216474 | A1* | 9/2008 | Turner ..................... 60/599 |
| 2009/0064678 | A1* | 3/2009 | Perrin et al. ............. 60/602 |
| 2010/0139268 | A1* | 6/2010 | Huber et al. ............. 60/602 |
| 2011/0011060 | A1 | 1/2011 | McCarthy, Jr. |

FOREIGN PATENT DOCUMENTS

| | | |
|---|---|---|
| DE | 198 38 703 | 3/2000 |
| DE | 198 39 754 | 3/2000 |
| DE | 10021421 A1 | 2/2002 |
| DE | 102 01 042 | 8/2003 |
| DE | 103 50 516 | 6/2005 |
| DE | 10 2005 012 066 | 9/2006 |
| EP | 0 580 931 | 2/1994 |
| EP | 1 122 413 | 8/2001 |
| EP | 1 152 133 A2 | 11/2001 |
| JP | 2 173 312 | 7/1990 |
| JP | 2000 345 829 | 12/2000 |
| JP | 2000 337135 | 12/2000 |
| JP | 2005 127257 | 5/2005 |

OTHER PUBLICATIONS

International Search Report Issued for PCT International Application No. PCT/EP2012/004193, mailed Jan. 21, 2013.
German Search Report Issued for German Patent Application No. 10 2011 117 090.5.
Final Office Action for U.S. Appl. No. 14/354,201, mailed Jul. 27, 2015.

* cited by examiner

EXHAUST SYSTEM WITH HC ADSORBER AND PARALLEL EXHAUST-GAS CATALYTIC CONVERTER, AND VEHICLE HAVING AN EXHAUST SYSTEM OF SAID TYPE

CROSS-REFERENCE TO RELATED APPLICATIONS

This application is a National Phase Application of PCT International Application No. PCT/EP2011/005583, International Filing Date Nov. 7, 2011, which in turn claims priority from German Patent Application No. 10 2010 056 281.5, filed on Dec. 24, 2010, both of which are incorporated herein by reference in their entirety.

BACKGROUND OF THE INVENTION

This invention relates to an exhaust system with HC adsorber and parallel exhaust gas catalytic converter and a vehicle that comprises such a system.

The use of catalytic converters in exhaust systems of internal combustion engines has become a matter of course today. For example, oxidation catalytic converters that convert unburned hydrocarbons (HC) and carbon monoxide (CO) are used for diesel engines in particular, and reduction catalytic converters that convert nitrogen oxides ($NO_x$) in both diesel and spark-ignition engines. In addition, three-way catalytic converters are known that combine the functions of oxidation and reduction catalytic converters and thus catalytically convert all three components; these are primarily used with spark-ignition engines. All catalytic converters generally require a specific minimum temperature called light-off temperature at which they convert 50% of the limited exhaust gas components. This temperature is typically not yet reached directly after a cold start of the engine, so that emissions called startup emissions leave the exhaust system unconverted unless other steps are taken.

Current and, of course, future exhaust gas legislation requires that the startup emissions measured in standardized test cycles are included in the determination of the overall emissions of a vehicle. The desire for further emission reduction and the increasingly dropping exhaust gas limits also necessitate that startup emissions are reduced as well and thus that the catalyst system reaches its operating temperature faster.

A common measure to reduce startup emissions is provide relatively small-volume preconverters, also called primary catalytic converters, at the hot end of the exhaust system. The preconverters reach their light-off temperature relatively fast due to their small volume and their hot end location, and they take over the conversion of most of the emissions until a downstream main catalytic converter has reached its operating temperature as well.

DE 100 21 421 A1 discloses an exhaust system in which an exhaust turbine of an exhaust turbocharger is provided in the main duct of the exhaust duct and can be bypassed via a parallel bypass duct. A three-way catalytic converter or a preconverter designed as a HC adsorber is provided in the bypass duct. A controllable flap can either seal the bypass duct or the main duct shut; intermediate positions of the flap may be provided. After a cold start, the entire exhaust gas flow is conducted through the bypass duct via the preconverter. As soon as a downstream primary catalytic converter has reached its light-off temperature, the flap is switched over and the exhaust gas flow is conducted via the exhaust turbine in the main duct.

US 2002/0132726 A1 describes an exhaust system that comprises a main catalytic converter and two parallel exhaust passages upstream of it, which can be selectively closed or opened using a switchover valve. The two parallel exhaust passages are arranged concentrically, wherein the main passage is at the center and the secondary passage in which an annular HC adsorber is located concentrically encompasses the main passage. A return passage that feeds unburned hydrocarbons desorbed from the adsorber back into the internal combustion engine branches off the secondary passage upstream of the HC adsorber. After a cold start, the interior main passage is closed and the exhaust gas flow is conducted via the HC adsorber that absorbs and/or chemically adsorbs unburned hydrocarbons and hydrocarbons not converted by the main catalytic converter that is not yet ready for operation. As soon as the main catalytic converter has reached its operating temperature and ensures sufficient HC conversion, the exhaust gas flow is directed into the main passage. As a result of the heating up that takes place, hydrocarbons desorb from the HC adsorber and are returned to engine combustion via the return passage.

A similar concept is known that also uses the concentric arrangement of exterior HC adsorber and interior main duct, however the main catalytic converter is not provided upstream but downstream of the HC adsorber in this design. The return passage described in US 2002/0132726 A1 can be eliminated in this design. Instead, the desorbed hydrocarbons are converted by the downstream main catalytic converter.

SUMMARY OF THE INVENTION

It is the object of this invention to further develop the prior art set forth above such that the operating temperature of the downstream main catalytic converter is reached faster and further reduction of startup emissions is achieved.

This object is achieved by an exhaust system and a vehicle having the features of the independent claims.

The exhaust system according to the invention for an internal combustion engine includes an exhaust path that comprises parallel exhaust ducts, namely a main duct and a secondary duct, at least in some of its sections. A HC adsorber for reversible adsorption of unburned hydrocarbons (HC) is provided in the secondary duct. In addition, a setting means for selectively conducting an exhaust gas flow into the main duct and/or the secondary duct is provided. The exhaust system further comprises a shared main catalytic converter located in the exhaust gas path downstream of the parallel exhaust ducts. The exhaust system according to the invention is characterized in that a catalytic exhaust gas converter for converting at least one exhaust gas component is located in the main duct that bypasses the HC adsorber.

Since the catalytic exhaust gas converter is located in that one of the exhaust ducts that does not contain the HC adsorber, i.e. the duct that bypasses the HC adsorber (bypass duct), the downstream main catalytic converter reaches its operating temperature faster as a result of the exothermic reaction of the upstream catalytic exhaust gas converter according to the invention, thereby reducing startup emissions. This also ensures optimum use of installation space since the main duct, which would be empty according to prior art, is used to accommodate a catalytic converter component.

The catalytic exhaust gas converter which, according to the invention, may be located in the main or bypass duct will hereinafter also be referred to as bypass catalytic converter.

The term "parallel exhaust ducts" is not necessarily meant in the geometrical sense in this invention but in terms of flow conditions, since both exhaust ducts are alternative flow paths for the exhaust gas flow.

In a preferred embodiment, the catalytic exhaust gas converter (bypass catalytic converter) located in the main duct is a three-way catalytic converter, which means that it supports the catalytic conversion of unburned hydrocarbons (HC), carbon monoxide (CO), and nitrogen oxides ($NO_x$). For this purpose, its catalytic coating may contain the precious metals platinum, palladium and/or rhodium, especially a combination of platinum and rhodium or of palladium and rhodium. Similarly, the downstream main catalytic converter may be a three-way catalytic converter and comprise a catalytic coating as described above.

If catalytic converters of the same type are used, the design may advantageously be such that a sum total of the conversion capacities of the main catalytic converter and the bypass catalytic converter and any optionally provided preconverters meets a predefined overall conversion output, especially in a defined standardized driving test cycle, preferably across the entire engine characteristic map, i.e. covering all operating points. In other words, the overall conversion output is distributed among the main and bypass catalytic converters and preconverters, if any. The advantage is that the volume and/or precious metal load of the main catalytic converter may be smaller than in prior art where no bypass catalytic converter is provided. The available installation space can be used more efficiently and flexibly due to the smaller volume.

A converter substrate of the bypass catalytic converter may in principle be a ceramic substrate (monolith) but it is preferred that it is designed as a metal substrate, especially in the form of wound metal foils. The use of a metal substrate has process engineering advantages because it can be assembled by welding and soldering. Also, metal foils provide for achieving particularly advantageous flow characteristics. The walls of the metal catalytic converter substrate or the metal foils may comprise passage openings, which reduces exhaust back pressure or flow resistance, respectively, and allows transverse flows of the exhaust gas. For example, perforated metal foils can be used for the metal substrate in this context. It is even more preferred that metal foils with notched passage openings in which small subsections of the foil are not completely punched out and removed but only punched along a portion of their contour and then bent open towards the one or the other side of the foil, preferably alternately. Notched metal foils (also called LS foils) have the advantage over perforated foils (PE foils) that no catalytic surface is lost by punching. Notched metal foils typically have a surface that is 30 to 35% larger than the catalytic surface of perforated foils. In addition, radial heat and material transfer is greater with notched than with perforated foils.

According to another preferred embodiment, the parallel exhaust ducts are designed such that the one encompasses the other at least in some sections. A concentric (coaxial) arrangement in which both ducts have a common center or central axis, respectively, is particularly preferred. The advantage of this design is optimum utilization of the installation space. In particular, the secondary duct that contains the HC adsorber may encompass the main duct that contains the bypass catalytic converter in this context. In this way, good thermal insulation of the bypass catalytic converter is achieved so that it heats up particularly fast after a cold start.

According to another advantageous embodiment, the setting means for selectively conducting the exhaust gas flow into the main duct and/or the secondary duct has intermediate positions in addition to the fully closed and fully open positions. If the setting means is not designed as a 2-point element with OPEN and SHUT positions but includes intermediate positions, a variable portion of the exhaust gas flow is conducted via the HC adsorber while the other portion is conducted via the bypass catalytic converter, which provides for yet another volume reduction of the downstream main catalytic converter.

In a special embodiment of the invention, the setting means is only provided at the inlet of the main duct and closes the main duct in its closed position or opens it in its open position. Such a design can be manufactured particularly easily and implemented favorably in combination with the concentric design of the parallel exhaust gas ducts.

Steps that ensure that at least a major portion of the exhaust gas flow passes through the main duct and the bypass catalytic converter located therein when the system operates at hot temperatures and both parallel exhaust ducts are open are particularly advantageous in conjunction with the design of the setting means described above. One option is that an inlet area of the secondary duct that contains the adsorber into the exhaust duct comprises an inlet opening designed such that a major portion of the exhaust gas flow will flow through the main duct if the setting means is in a position in which both the main and the secondary duct are open. The smaller the cross section of the inlet opening of the secondary duct, the greater the flow resistance at this site and thus the tendency to choose the main duct.

Another measure in this context may be that a number of cells of the bypass catalytic converter is smaller than a number of cells of the HC adsorber. This also leads to less flow resistance in the catalytic converter, so passing through this component rather than the adsorber is preferred when the setting means is open.

According to yet another preferred embodiment, the parallel exhaust ducts containing the HC adsorber and the bypass catalytic converter and the downstream main catalytic converter are integrated in a shared housing, which may in particular be located at an underbody position of the vehicle.

Another aspect of this invention relates to a vehicle that comprises the exhaust system according to the invention. The vehicle preferably comprises a spark-ignition engine. It is preferred in this case that the bypass and main catalytic converters are designed as three-way catalytic converters.

Other preferred embodiments of the invention result from the other features mentioned in the dependent claims.

BRIEF DESCRIPTION OF THE DRAWINGS

The invention will be explained using exemplary embodiments and with reference to the associated figures. Wherein.

DETAILED DESCRIPTION OF THE INVENTION

Figure 1:
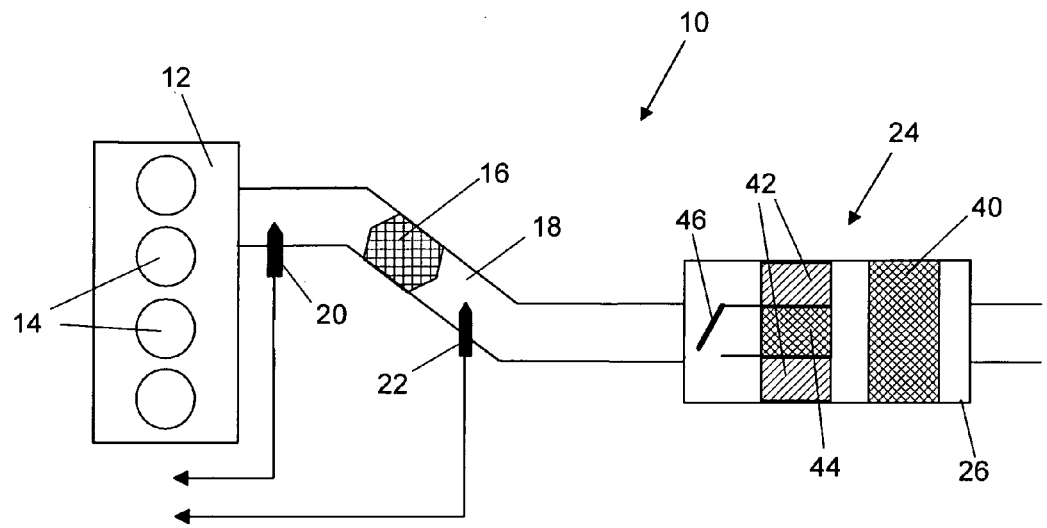
FIG. 1 shows a diagram of an exhaust system according to the invention.

FIG. 1 shows an overview of an exhaust system 10 according to the invention.

The exhaust gas from an internal combustion engine 12, for example a spark-ignition engine, first enters an exhaust manifold not shown here when it passes the outlets of the cylinders 14 of the engine. A small-volume preconverter 16 may be provided at a hot end position close to the engine, in particular immediately following the exhaust manifold; this preconverter acts as a startup converter in that it heats up very fast after a cold start of the engine and performs the main conversion job after its light-off after the engine start until the downstream catalytic converter takes over. The preconverter may be an oxidation or three-way catalytic converter depending on the type of internal combustion engine. The preconverter 14 may, for example, be connected to an exhaust pipe 18 by means of a flanged joint.

A first lambda sensor 20 that measures the oxygen content of the crude exhaust gas and is used in a known manner to control the air-fuel mixture of the engine is provided at a hot end position upstream of the preconverter 14. Furthermore, a second lambda sensor 22 may be provided downstream of the preconverter 16. The second lambda sensor 22 can perform various functions. For example, it can be used for diagnosing the preconverter 16, for balancing the sensors, and/or for mixture control.

The outlet end of the exhaust pipe 18 is connected to a catalytic converter unit 24 that will be explained in greater detail below with reference to FIG. 2.

The catalytic converter unit 24 comprises a shared converter housing 26 in the embodiment shown. The inlet-side section of the converter housing 26 comprises a concentric inner pipe 28, splitting the exhaust gas path into two parallel exhaust ducts: an interior main duct 30 and an annular secondary duct 32 that encompasses the main duct 30. The parallel exhaust gas ducts 30, 32 are reunited at a junction section 34. The junction section 34 in the embodiment shown is designed as a collar-like expansion of the inner pipe 28 and comprises multiple inlet openings 36 through which the exhaust gas from the secondary duct 32 flows into a common exhaust duct 38.

The catalytic converter unit 24 contains various exhaust gas cleaning components. A main catalytic converter 40 that particularly comprises a three-way catalytic coating and can therefore be used to convert unburned hydrocarbons (HC), carbon monoxide (CO), and nitrogen oxides ($NO_x$) is provided downstream of the parallel exhaust ducts 30, 32 and the junction section 34 in the common exhaust duct 38. Furthermore, an annular HC adsorber 42 is provided in the secondary duct 32. The HC adsorber 42 may comprise a ceramic substrate but it is preferred for process engineering reasons that the substrate consists of metal and a zeolite coating that is capable of binding unburned hydrocarbons by adsorption or chemisorption and of desorbing it again at increased temperatures. Suitable HC adsorbers 42 are known to a person skilled in the art and need no further explanation.

According to the invention, an catalytic exhaust gas converter 44 for converting at least one exhaust gas component and is in particular of the same type as the downstream main catalytic converter 40, i.e. a three-way catalytic converter in the embodiment shown, is provided in the main duct 30 that bypasses the HC adsorber 42. The catalytic exhaust gas converter 44 preferably comprises a metal substrate made of wound metal foils like the HC adsorber 42. After being separately coated with zeolites in the case of the HC adsorber 42 or a three-way coating in the case of the catalytic converter 44, the components can be individually inserted and soldered or welded together.

The catalytic converter unit 24 further comprises a setting means 46 for selectively diverting the exhaust gas flow into the main duct 30 and/or into the secondary duct 32. The setting means 46 in the embodiment shown is designed as a flap hinged along one axis and provided on the inlet side of inner pipe 28; it can be moved by a suitable actuator between an open position shown in FIG. 2 and a closed position shown in FIG. 3. In the closed position as shown in FIG. 3, the flap closes the main duct 30 so that the exhaust gas flow is conducted through the secondary duct 32 and the HC adsorber 42. In the open position as shown in FIG. 2, both the main duct 30 and the secondary duct 32 are open. Various precautions explained below may have been taken to conduct the exhaust gas flow, or at least the major portion thereof, through the catalytic exhaust gas converter 44. It is also preferred that the setting means can be set to intermediate positions such that a portion of the exhaust gas flow can be conducted into the main duct 30 and another portion into the secondary duct 32.

Steps are taken that keep the back pressure of the exhaust gas in the main duct 30 relatively small compared to the exhaust gas back pressure in the secondary duct 32 to conduct at least a major portion of the exhaust gas flow through the main duct 30 and the catalytic converter 44 contained in it when the setting mean 46 is open. In particular, a smaller cell count per cross sectional area is selected for the catalytic converter 44 than the cell count of the HC adsorber 42. For example, the catalytic converter 44 has a cell count of 200 to 300 cpsi (cells per square inch) and the adsorber 42 of 300 to 600 cpsi. The exhaust gas flow can further be influenced by a suitable design of the inlet openings 36, where smaller cross sections increase the exhaust gas back pressure and force the exhaust gas flow through the main duct 30. Finally, the use of metal foil comprising passage openings for the converter substrate of the catalytic exhaust gas converter 44, preferably a notched metal foil, can reduce the back pressure of the catalytic converter 44.

Figure 2:
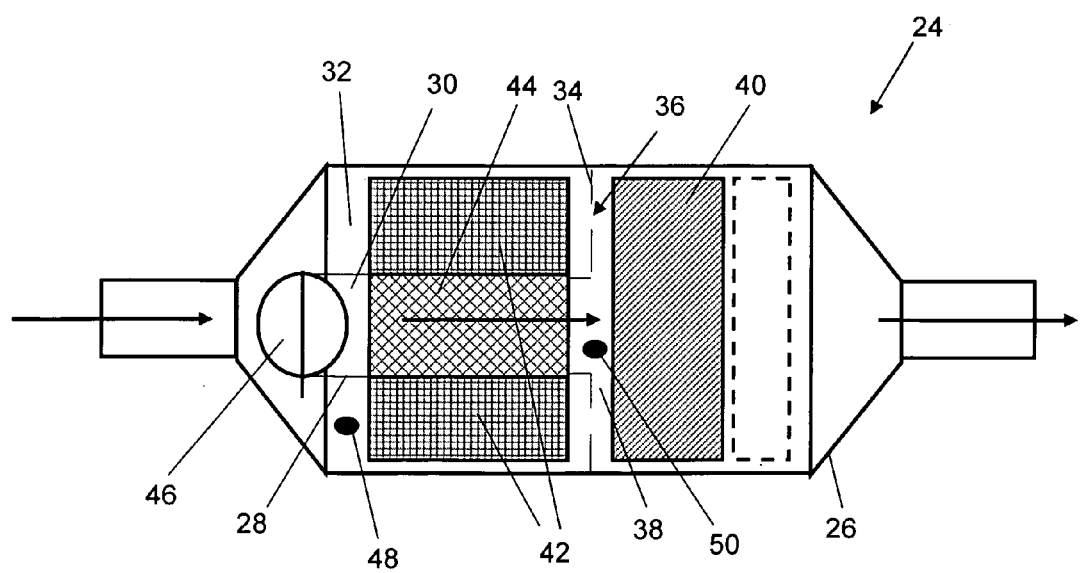
FIG. 2 shows a partial view of the exhaust system according to FIG. 1 having a catalytic converter unit according to the invention with the setting means open.
Figure 3:
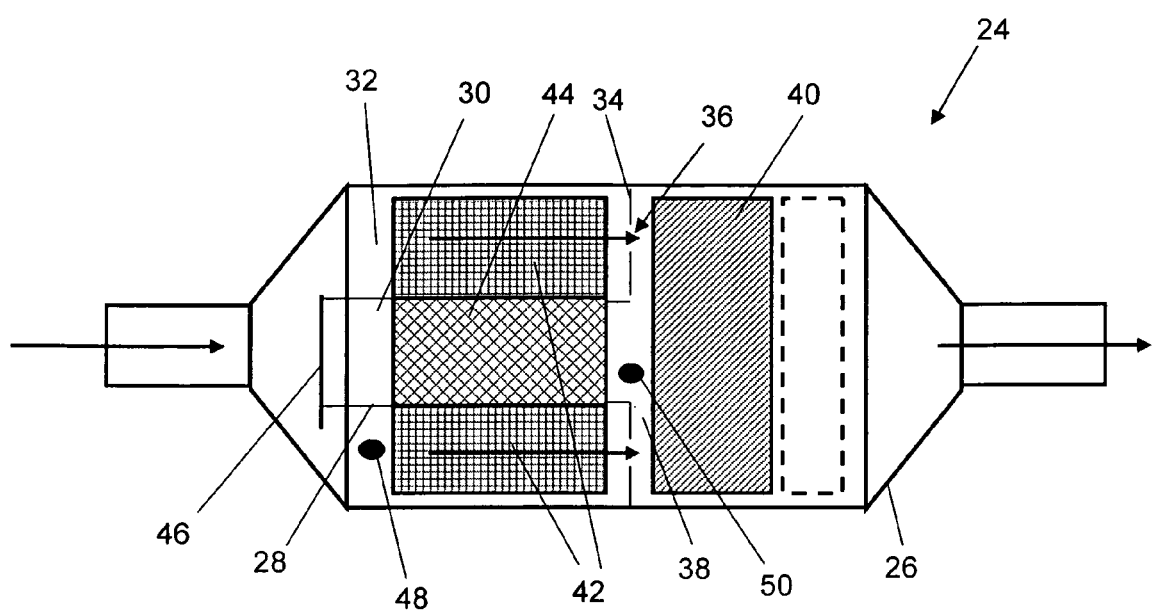
FIG. 3 shows the partial view according to FIG. 2 with the setting means closed.

Temperature sensors are provided at the positions numbered 48 and 50 in FIG. 2, that is, upstream of the HD adsorber 42 and in the shared exhaust duct 38 upstream of the main catalytic converter 40 to control the setting means 46 and thus to conduct the exhaust gas flow via the HC adsorber 42 and/or via the catalytic exhaust gas converter 44. The sensors 48, 50 measure the exhaust gas temperature and thus allow for inferring the temperatures of the HC adsorber 42 or the main catalytic converter 40, respectively. It is also conceivable to install the temperature sensors directly in the respective components.

The exhaust system 10 shown in FIGS. 1 to 3 operates as follows.

After a cold start of the internal combustion engine, when the catalytic converters 16, 44, and 40 have not yet reached their operating temperature, the setting means 46 in front of the main duct 30 is closed (FIG. 3), and the entire exhaust gas flows through the HC adsorber 42. The HC adsorber 42 stores the hydrocarbons contained in the exhaust gas that pass through the preconverter 16 unconverted while it is not yet ready for operation in the first seconds after the engine start. The adsorber 42 is dimensioned such that the hydrocarbons can be stored completely until the preconverter 16 has reached its light-off temperature and starts to convert them.

When the preconverter 16 has reached this temperature, which can be detected by modeling or using the temperature sensor 48, the setting means 46 opens so that the hot exhaust gas flows via the catalytic exhaust gas converter 44 and heats it up (FIG. 2). As soon as the catalytic exhaust gas converter 44 reaches its light-off temperature, its further heating up accelerates due to the exothermics of the conversion reactions. In addition, the exhaust gas heated up in this way by the catalytic exhaust gas converter 44 flows into the main catalytic converter 40 and heats it up.

If the temperature sensor 50 detects that the main catalytic converter has reached its light-off temperature as well, the setting means 46 is partially or completely closed again (FIG. 3), and the entire exhaust gas flow or a specific portion thereof is conducted via the HC absorber and heats it up. When the adsorber has reached its desorption temperature, the stored hydrocarbons are released and flow through the inlet openings 36 into the common exhaust duct 38 and into the main catalytic converter 40 where they are converted into $CO_2$ and $H_2O$.

Altogether, the heating up of the downstream main catalytic converter 40 and its light-off after a cold start are considerably accelerated by providing the catalytic exhaust gas converter 44. Thus the operational state of the entire system is achieved faster than in prior art where the main duct 30 is designed as a pipe without a catalytic converter.

The volumes and/or precious metal loads of the catalytic exhaust gas converter 44 and the main catalytic converter 40 and—if equipped—the preconverter 16 are dimensioned such that the sum total of their conversion outputs meets a predetermined, sufficient and high overall conversion output across the entire operating characteristic of the engine. This means that the limited exhaust gas components must at least be converted in accordance with specifications, even in the respective high-speed phases of the test cycle. In addition, the main catalytic converter 40 has to be able to convert the desorbed hydrocarbons in the desorption phase of the HC adsorber 42. Therefore the main catalytic converter 40 can be dimensioned smaller compared to a similar system in which no catalytic exhaust gas converter 44 is provided in the main duct 30 since the catalytic exhaust gas converter 44 provides additional surface area with catalytic activity. In an extreme case, if the preconverter 16 and the catalytic exhaust gas converter 44 can generate sufficient conversion output in the test cycle, the main catalytic converter 40 can be dimensioned such that it only converts the hydrocarbons released in the desorption phase. In this case, a pure oxidation function of the main catalytic converter 40 may be sufficient. The converter volume of the main catalytic converter 40 that is saved in comparison to a design without a catalytic exhaust gas converter 44 is outlined by a broken line behind the main catalytic converter 40 in FIG. 2. The invention also provides for improved and more flexible utilization of the installation space.

LIST OF REFERENCE SYMBOLS

10 Exhaust system
12 Internal combustion engine
14 Cylinder
16 Preconverter
18 Exhaust pipe
20 First lambda sensor
22 Second lambda sensor
24 Catalytic converter unit
26 Converter housing
28 Inner pipe
30 Main duct
32 Secondary duct
34 Junction section
36 Inlet openings
38 Common exhaust duct
40 Main catalytic converter
42 HC adsorber
44 Catalytic exhaust gas converter
46 Setting means
48 Temperature sensor
50 Temperature sensor

The invention claimed is:

1. An exhaust system for an internal combustion engine comprising:
    an exhaust gas path comprising two parallel exhaust ducts, namely a main duct and a secondary duct, at least in some of its sections,
    a setting means configured to selectively conduct an exhaust gas flow into the main duct or the secondary duct,
    a HC adsorber provided in the secondary duct for reversible adsorption of unburned hydrocarbons (HC),
    a bypass catalytic converter provided in the main duct for converting at least one exhaust gas component,
    a main catalytic converter located in a common exhaust duct downstream of the two parallel exhaust ducts, and
    a junction section of the secondary duct comprising at least one inlet opening configured to increase the exhaust gas back pressure in the secondary duct causing at least a major portion of the exhaust gas flow to flow through the main duct when the setting means is in an open position in which both the main duct and the secondary duct are open, and
    wherein the bypass catalytic converter and the main catalytic converter are adapted to force the exhaust gas flow to flow in an upstream to downstream direction in both the main duct and secondary duct when the setting means is in the open position.

2. The exhaust system according to claim 1, wherein the bypass catalytic converter provided in the main duct is a three-way catalytic converter.

3. The exhaust system according to claim 1, wherein the main catalytic converter is a three-way catalytic converter.

4. The exhaust system according to claim 1, wherein the setting means for selectively conducting the exhaust gas flow into the main duct and/or into the secondary duct includes intermediate positions in addition to its fully closed position and its fully open position.

5. The exhaust system according to claim 1, wherein the setting means is only provided in the region of the main duct and closes the main duct in its closed position and opens the main duct in its open position.

6. The exhaust system according to claim 1, wherein a cell count of the bypass catalytic converter located in the main duct is smaller than the cell count of the HC adsorber.

7. The exhaust system according to claim 1, wherein the parallel exhaust ducts with the HC adsorber and the bypass catalytic converter and the downstream main catalytic converter are incorporated in a shared converter housing.

8. The exhaust system according to claim 1, wherein the setting means is adapted to selectively conduct a variable portion of the exhaust gas flow into the main duct and the secondary duct.

9. The exhaust system according to claim 1, wherein a sum total of the conversion capacities of the main catalytic converter and the bypass catalytic converter provided in the main duct and of an optionally provided preconverter is configured such that it meets a predetermined overall conversion output.

10. The exhaust system according to claim 9, wherein the sum total of the conversion capacities of the main catalytic converter and the bypass catalytic converter provided in the main duct and of an optionally provided preconverter is configured such that it meets a predetermined overall conversion output within the entire engine characteristic map.

11. The exhaust system according to claim 1, wherein the bypass catalytic converter provided in the main duct comprises a metal converter substrate the walls of which comprise passage openings.

12. The exhaust system according to claim 11, wherein the walls of the metal converter substrate comprise punched out passage openings and/or notched passage openings.

13. The exhaust system according to claim 1, wherein the parallel exhaust ducts are arranged such that one of the parallel exhaust ducts at least partially encompasses the other of the parallel exhaust ducts.

14. The exhaust system according to claim 13, wherein the secondary duct that houses the HC adsorber encompasses the main duct.

15. The exhaust system according to claim 13, wherein the parallel exhaust ducts are arranged such that one of the parallel exhaust ducts encompasses the other of the parallel exhaust ducts in the form of a concentric structure.

16. A vehicle with an internal combustion engine having an exhaust system according to claim 1 connected thereto.

\* \* \* \* \*